United States Patent Office 3,632,725
Patented Jan. 4, 1972

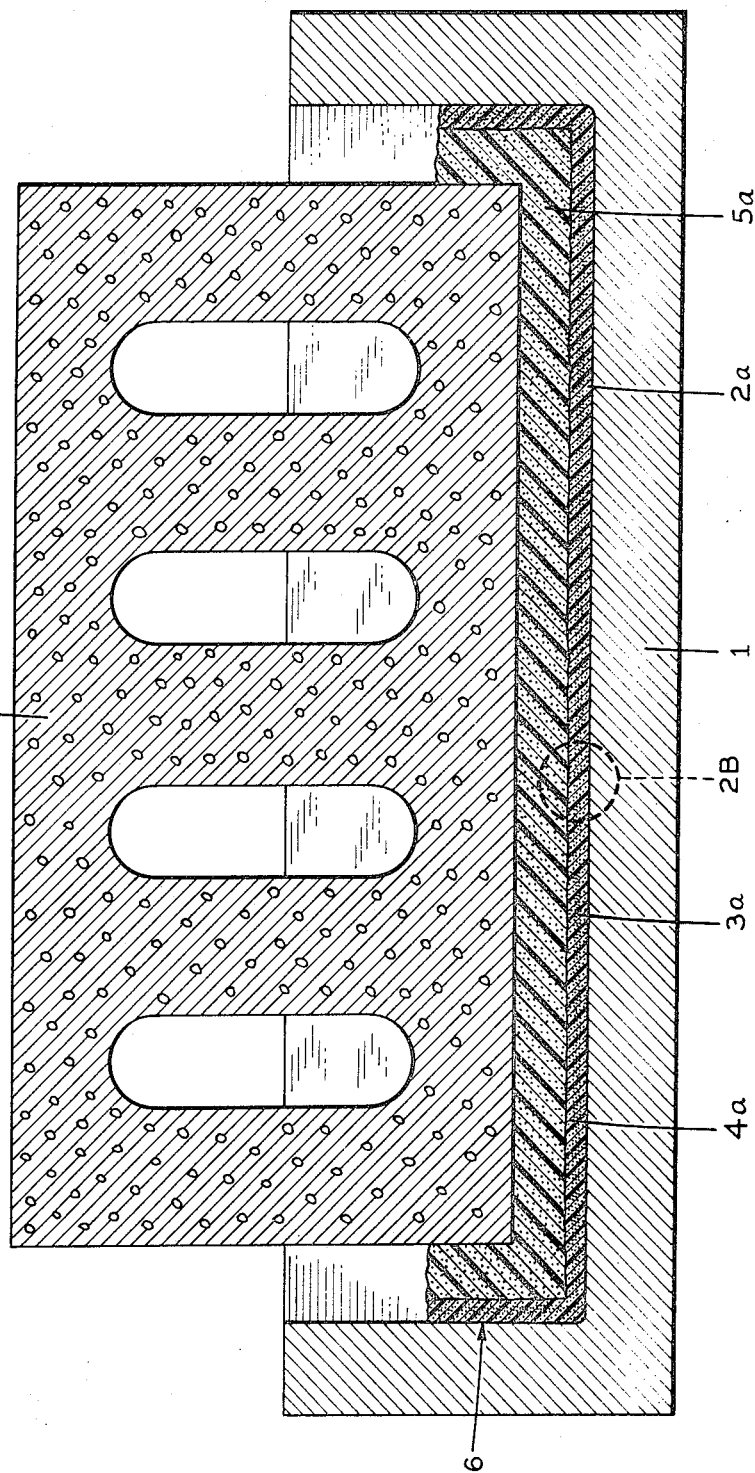

3,632,725
METHOD OF FACING MASONRY BLOCKS
James F. Jones, Baltimore, Md., assignor to The Burns & Russell Company of Baltimore City, Baltimore, Md.
Filed Feb. 4, 1970, Ser. No. 8,450
Int. Cl. B28b 1/16
U.S. Cl. 264—256                                9 Claims

ABSTRACT OF THE DISCLOSURE

A method for facing a masonry building block consisting of adding consecutively to an appropriate mold a thin coating of surface material comprising a thickened mixture of an ethylenically unsaturated polyester resin and a polymerizable monomer, an approximately single-grain layer of sand, a second thin coating of surface material, a slurry comprising an ethylenically unsaturated polyester resin and a polymerizable vinyl monomer into which has been incorporated a major proportion by weight of sand, and a masonry block; and simultaneously curing the facing resins while the above materials are thus assembled.

This invention relates to the attainment of a gloss finish on a facing of a hardened cured composition of a polyester resin and sand in which the sand constitutes a major proportion of the cured composition. More particularly, this invention relates to improving the ease of cleaning of coated masonry building units in which the coating comprises a cured composition of ployester resin and at least 50% by weight of sand.

There are disclosed in U.S. Pat. No. 2,751,775, issued June 26, 1956 to John A. Sergovic, coated masonry building units prepared by coating a masonry building block with an adherent, integral, dense, hard coating made of a cured composition of a polyester resin and sand, in which the sand comprises at least 50% by weight of the coating composition. There is disclosed in U.S. Pat. No. 3,328,231, issued June 27, 1967 to John A. Sergovic, an improvement in the stain resistance of the coating. Since the present invention relates to improvements in the invention disclosed in these patents, it is intended to incorporate by reference the disclosures of said patents in their entireties.

Coated masonry building units made according to the teachings of said patents provide surfaces that are resistant to mechanical injuries, temperature changes and moisture. These surfaces resemble baked ceramic finishes, yet have superior properties and can be produced at a fraction of the cost. However, the finish of the coated masonry units is comparatively dull and hence not nearly so easy a surface to clean as a baked ceramic finish. One of the major uses for coated masonry building units being for interior walls of hospitals and schools, thorough and easy cleaning is of primary importance. In many instances a more lustrous surface is also aesthetically desirable.

Accordingly, it is an object of the present invention to provide a process for producing a gloss finish on and enhancing the ease of cleaning of a masonry facing composition comprised of an ethylenically unsaturated polyester resin and sand, in which sand comprises at least about 50% by weight of the cured composition.

It is an additional object of the invention to provide a process which is an economical modification to the process of U.S. Pat. No. 2,751,775 and which, when combined with the latter process, produces a facing of a cured composition of an ethylenically unsaturated polyester resin and a major proportion of sand, which facing is cured as an entire unit and has a glossy surface.

It is a further object of this invention to provide coated masonry building units having a face of a cured composition of polyester resin and sand which has a glossy, easily cleaned surface.

These and other objects of the invention will be better understood by reference to the present description taken in conjunction with the accompanying drawings in which:

FIG. 1 is a cross-sectional representation of a mold containing a faced masonry building unit produced according to this invention;

Figure 2A:
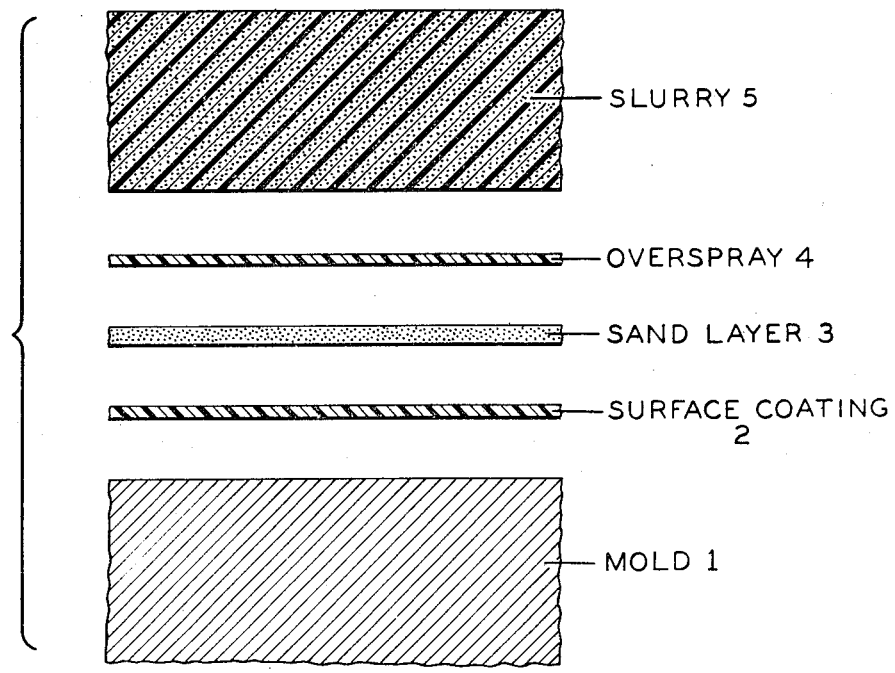
FIG. 2A is an exploded cross-sectional view showing the facing materials as individually applied to the mold.

In the process disclosed in U.S. Pat. No. 2,751,775, issued to John A. Sergovic, coated masonry building units are prepared by adding to a mold a slurry comprising a polyester or other ethylenically unsaturated polymer, a polymerizable monomer such as styrene, polymerization catalyst, sand, and beneficial additives and pigments; placing the masonry block to be faced onto the slurry, the weight of the block being sufficient to ensure penetration of the coating into the pores of the block; and curing the facing while it is thus in contact with the block.

Attempts have been made to alter the surface of the facing by applying a coating of glossy polymeric material to the already cured facings of masonry building units. Although glossy coatings have been attained, these attempts have been unsuccessful due to lack of satisfactory adhesion of the coating to the facing and the undesirable surface effects of crazing and cracking which have been incurred.

In accordance with that object of this invention which is to modify the process of the Sergovic Pat. No. 2,751,775 to provide a product with a glossy surface, attempts were made to apply to a mold prior to introduction of the facing slurry a surface compound of the desired gloss. Utilization as the surface compound a mixture of an ethylenically unsaturated polyester resin and a polymerizable monomer solvent, similar to the slurry except that no sand is added, and curing of the surface compound in contact with the slurry bonded the surface coating integrally to the facing and eliminated the defects of crazing and cracking of the surface. However, the surface of the finished masonry building unit was found to be unsatisfactory because the slurry, either upon its application to the mold or under the weight of the masonry block, tended to break through the surface compound. The result was a product surface which appeared splotchy due to the relative dullness of the sand-containing backup slurry. The advantage of easy cleaning was also considerably reduced.

Two causes for penetration of the backup slurry through the surface coating were found. First, the surface compound, when applied as a liquid, tended to run off the vertical edges of the mold. Second, the surface compound had insufficient cohesiveness to remain intact as a layer in the mold under the weight of the slurry and the masonry block. In order to overcome these difficulties, a sandwich comprising a thin layer of sand between coatings of the surface compound, which compound has been made more viscous by the addition of a thixotropic agent, has been devised. Simply adding a practical amount of such a thickening agent to the surface compound has been found to be insufficient to prevent the backup slurry from penetrating to the surface. It has been found that by adding to the mold before the backup slurry a coating of thickened surface compound, a thin layer of sand, and a second coating of surface compound, the process of Sergovic Pat. No. 2,751,775 can be adapted to produce a coated masonry building unit which has the desirable properties of units manufactured according to that patent and additionally has a surface which is lustrous and easy to clean and which surface layer is integrally bonded to the backup slurry, thereby eliminating any tendency to chip, craze or crack. Additionally, the surface compound has been found susceptible of economical application to a mold by means of ordinary commercial sprayers.

In the preparation of the surface compound and the backup slurry the polyester resins employed are a class of resins with which the resin chemist is familiar. These are ethylenically unsaturated polyester resins. The preferred resins of this class for employment in the block facing compositions of the invention are the polymeric ester reaction products of one or more dicarboxylic acids and one or more polyhydric alcohols. Desirably one or more of these reactants shall contain a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol, propylene glycol, and dipropylene glycol. A mixture of propylene glycol and dipropylene glycol is the most satisfactory source of polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired.

The resin component of the preferred surface forming compositions for building blocks desirably also contains a non-volatile, monomeric, polymerizable solvent for the polyester resin or other resin employed. A polymerizable vinyl monomer is preferred. The function of this solvent is to make the polyester resin more fluid so that the molding composition may be more easily applied to the mold. This monomeric solvent is an important member of the resin component, for it provides the necessary fluidity to the molding composition, and is polymerized during the curing of the resin without forming volatile materials. This freedom from volatility is highly important, for otherwise the release of volatile matter would produce bubbles, voids or pinholes on the surface and throughout the cured product. The lack of volatile matter permits curing without requiring provision for vents, etc., in the molds. Also, escaping combustible, volatile matter might produce explosions or fire hazards.

Among the monomeric polymerizable solvents which may be used are the hydrocarbons: styrene, vinyl toluene, p-methyl styrene, vinyl chloride, vinylidene chloride, acrylates, methacrylates, isoprene, and cyclopentadiene; vinyl acetate; diallyl phthalate and triallyl cyanurate. Styrene is preferred for this purpose except where the smoke producing tendency of styrene cannot be controlled to the desired extent. Substitution of acrylates or methacrylates for all or part of the styrene reduces the smoke producing tendency of the facing.

When obtained commercially, the polyester resins usually also contain a small amount of a polymerization inhibitor so as to prevent gelation during storage prior to usage. Such inhibitors include the well-known anti-oxidants: hydroquinone, t-butyl catechol, quinone, etc.

Polyester resins of the character contemplated for use in facing building blocks are sold in the trade and identified as "Paraplex" or "Laminac" resins. In general, these resins are unsaturated low to medium molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination. Certain of these resins form masses upon curing that are very rigid or inflexible, while others form more flexible, rubbery masses. It is preferred to use a rigid resin for the surface composition, and it is economically advantageous to base the backup slurry mixture on the surface composition. It has been found that a mixture of one part of flexible resin with from two to five parts of rigid resin produces excellent results for the backup slurry. These proportions may, of course, be varied within wide limits depending upon the particular properties desired for the cured masonry unit and the properties of the resins that are mixed.

In the surface compound the ratio of resin to solvent should desirably be from 40:60 to 80:20 and preferably about 60:40. To prepare the surface compound any desired coloring agents, fire retardants, catalysts, anti-foaming agents, wetting agents and a thickening agent are added to the desired resin/solvent mixture. It has been found possible to extend the surface compound while not sacrificing the glossy finish by adding to the mixture a very fine inert filler. The filler should have a particle size in the range of 300 mesh or smaller. Asbestine, a naturally occuring magnesium silicate, 99 percent of which passes through a 325-mesh screen, has given excellent results. Sufficient filler may be used to increase the non-resin/solvent portion to at least 20–30% by weight of the surface compound. Thus extended the surface compound may still be applied by ordinary spraying equipment.

The incorporation of an anti-forming agent into the surface compound is desirable if the formation of air bubbles is to be minimized. Best results to date have been obtained with Dow-Corning Antifoam A. An amount of about 0.1% by weight of this agent based on the total amount of surface compound provides satisfactory results in most cases.

Where flame proofing is desired, flame proofing finishes commonly employed for textiles have been found satisfactory. Textile flame proofing finishes are commonly based on mixtures of antimony oxide or oxychloride and chlorinated organics such as chlorinated paraffin or chlorinated rubber. Addition of 6% by weight of a 70% chlorinated paraffin and 3% by weight of antimony oxide, based on the total amount of resin and polymerizable solvent, has imparted satisfactory fire retardant properties to the surface compound.

In order to insure complete coverage of the mold and intimate contacting with the sandwiched layer of sand, it is desirable to add a wetting agent to the surface compound. Numerous wetting agents employed for polymer manufacturing are commercially available. Excellent results have been obtained with 0.3% by weight, based on the total surface compound, of Triton X114, manufactured by Rohm & Haas Company. The composition of this wetting agent is considered proprietary by the manufacturer.

In order that the surface compound have sufficient body to remain where sprayed and to remain intact under the weight of the masonry block, it is necessary to add a thickening agent to the compound. Commercially thixotropic agents, the compositions of which are generally considered proprietary by their manufacturers, have been found to be satisfactory. Commercial thickeners available for this use include "Cab-O-Sil," manufactured by Godfrey L. Cabot, Inc., "Santosil" manufactured by Monsanto Company, and "Bentol," a product of National Lead Company. The thickener that I have selected is "Cab-O-Sil," a colloidal silica. Incorporation of about 2.7% by weight of "Cab-O-Sil," based on the total surface compound, has been found to yield the most satisfactory product. If the content of thickener is raised to about 4%, the surface compound becomes extremely thick and therefore difficult to handle and spray. If the content is lowered to about 1%, the sprayed coating of surface compound has been found to have insufficient cohesion to prevent the backup layer of slurry from being forced by the weight of masonry block to the surface of the mold. The limitation on the amount of thickener to be employed is governed solely by the viscosity characteristics of the surface compound and is very easily determined for any particular compound.

For preparation of the backup slurry the same polyester resin and the same polymerization solvents that have been described for the surface compound are used. The ratio of resin to solvent should desirably be from 40:80 to 80:20 and preferably about 40:60, as compared to the preferred 60:40 ratio for the surface compound.

A suitable catalyst should be added to the initial liquid resin mixture just prior to the addition of the filler, or after the addition of the filler part and just prior to the molding operation. The molding operation should be initiated within a period of time after the addition of the catalyst to the mixture containing the resin, otherwise the mixture may become too viscous for convenient charging of the mold as a result of premature polymerization.

A large number of free radical catalysts such as benzoyl peroxide, t-butyl perbenzoate and the like, with which those skilled in the resin art are for familiar, may be used satisfactorily. The optimum concentration for those catalysts which have been tested, including t-butyl perbenzoate and methyl ethyl ketone peroxide, is in the range of 1% to 2% by weight of the resin plus resin forming components, whereas the general practice in the art for these catalysts is the use of an amount of from 0.5% to 2%. The catalyst concentration to be used is greately dependent upon the speed desired for curing.

It has been found to be desirable to incorporate a suspending agent into the initial liquid resin mixture. The preferred suspending agents are the cation modified clays, such as are disclosed in U.S. Pat. No. 2,531,427 which issued on Nov. 28, 1950 to Ernst A. Hauser. These cation modified clays are essentially clays, such as bentonite, which normally possess cation exchanging properties and which have in place of the normal exchangeable cation an onium base. Such onium derivatives of the clays are the ammonium, phosphonium, oxonium, sulfonium, arsonium, stibonium and telluronium derivatives. The ammonium base clays are preferred. Excellent results have been obtained by incorporating about 2% to 10%, and preferably 2.5% by weight of dimethyldioctadecylammonium bentonite. This particular onium base derivative is supplied by the National Lead Company under the trade name "Bentone 34." This material has a specific gravity of 1.8 and is desirably of a small particle size, such as 0.05 to 1.0 micron in length.

The employment of these cation modified clays imparts a suspending action upon the high percentage of inorganic filler and prevents it from settling out before the molding composition has undergone an initial curing and has begun to solidify. This provides a homogeneous resin coating.

The incorporation of an anti-foaming agent into the composition is desirable if the formation of air bubbles is to be minimized. Best results to date have been obtained with Dow-Corning Antiform A. An amount of about 0.1% by weight in the surface compound and 0.2% to 0.75% by weight in the backup slurry provides satisfactory results in most cases.

It is desirable to incorporate in the backup slurry a material such as magnesium hydroxide ($Mg(OH)_2$) which liberates moisture at 500–1000° F. Finely divided magnesium hydroxide substantially reduces the smoke generating properties of the resinous facing, acts as a smoke retardant, as is disclosed in pending application Ser. No. 589,516 filed Oct. 26, 1966 by John A. Sergovic et al. Naturally occurring magnesium hydroxide, brucite, or magnesium hydroxide prepared by chemical synthesis from various compositions can be used. Various starting materials and processes are disclosed in the United States patents of: Ben-Ari, 3,170,762, issued Feb. 23, 1965; Periard et al., 3,127,241, issued Mar. 31, 1964; Kippe, 2,852,340, issued Sept. 18, 1958; and Kippe, 2,801,155, issued July 30, 1957. The backup slurry should contain from 3% to 50% of the magnesium hydroxide smoke retardant to provide satisfactory reduction of smoke generation.

The sand filler provides a diluting medium enabling savings of the more expensive polymerizable resins and also contributes very desirable properties of its own which are essential for a satisfactory surface. "Sand" as employed herein is used in its ordinary sense and includes loose material comprising small but easily distinguishable grains resulting from the disintegration of rocks. The grains are usually of between about one-sixteenth and two mm. in diameter. Consequently, sand is not limited to silica sand, but may include other types of sand. Sand filler is desirable since it consists of rounded particles. Rounded particles will nest more closely together than will rough, irregularly shaped particles. Rounded particles will slide past one another more readily than rough, irregular particles and are thus extremely beneficial in enhancing the flowability of the coating or molding composition in charging a mold. Because of this latter property they permit substantial savings in the amount of polymerizable resins required, as it becomes possible to increase the filler concentration and yet obtain excellent flowability. It is for this reason that sand is desired as a filler, for most sand particles are more smooth and rounded than are many of the other filler materials.

By employing sand having a graduation of particle sizes a number of advantages may be obtained. It is advantageous to be able to use a coating or composition having the greater possible ratio of sand to resin. Not only are the resins substantially more expensive, but, as has been stated above, the sand contributes essential properties to a satisfactory cast surface.

Satisfactory results have been obtained when using sand having a maximum particle size of about a 20-mesh sieve.

In practice, it is desired to use sand or filler particles having at least two general particle size classifications, one of which may be said to be of large size (in the order of 20–70 mesh). It is desirable to employ a major proportion, and preferably 60% or more, by weight of the large size particles. One particularly successful gradation is one in which about 70% by weight of the sand is of approximately 20–60 mesh, 10% is of 60–120 mesh and 20% is 320 mesh. A gradation of 80% of 20–60 mesh size and 20% of 70–200 mesh is also quite satisfactory.

It has been found that it is particularly desirable in a casting composition for facings on building blocks to employ at least about 50% by weight of filler or sand and preferably from 70% up to about 80% or 90%, and at least about 10%, and desirably more than 15%, by weight of the resin solids and polymerizable solvent, if one is to obtain the most satisfactory cast articles or facings. For purposes of this calculation the amount of smoke retardant, when significant, should be considered a filler.

The flow characteristics of sand slurries can be greatly improved by the addition of a small amount of polyethylene powder of very fine (5 to 30 micron) particles size, such as Microthene-FN 500, manufactured by United States Industrial Chemicals Corp. Addition of 1% to 2% by weight of Microthene-FN 500 to the slurry has given excellent results.

Improved bonding of the sand to the polyester resin can be achieved by treating the sand particles with an alkylene substituted silane bonding agent according to the teachings of U.S. Pat. No. 3,328,231, issued June 27, 1967 to John A. Sergovic. The stain resistance of the slurry is enhanced by the improved bonding. This treatment is especially important for the layer of sand in the surface coating, because that layer of sand is very close to the surface of the finished masonry building unit. Where maximum stain resistance is desired, it has been found advantageous to also treat the magnesium hydroxide smoke retardant with an alkylene substituted silane bonding agent.

Referring more particularly to the FIG. 2A, a thin layer of the liquid surface compound 2 is first applied, preferably by spraying, to mold 1. The mold for preparing the coated masonry unit may desirably, although not necessarily, be lined with a glass enamel, frit or porcelain, and is preferably only slightly larger inside than the dimensions of the face of the building unit to be coated. Ordinary commercial spraying equipment, utilizing air atomization, has been found to be satisfactory. Commercially available automatic reciprocating sprayers, which have spray guns that are mounted on a cross-arm and that travel in a horizontal plane across the mold, may be utilized to impart assembly line techniques to the spraying operation.

The layer of surface compound 2 sprayed into the mold 1 must be of sufficient depth to insure that the backup layer of slurry will not be forced to the surface. It is normally desirable to use a minimum of surface compound because of the relatively high cost of that compound in relation to the cost of the backup slurry, which contains a large proportion of sand. If a smoke suppressant such as magnesium hydroxide is added to the backup slurry only, the use of a larger than necessary quantity of surface compound will have a deleterious effect on the smoke development characteristics of the facing. For coating 8-inch x 16-inch masonry blocks a layer of 0.15 to 0.27 gram per square inch (20 to 35 grams per block) has been found to yield consistently good results. Application of 0.1 gram per square inch (12 grams per block) has been found to be an insufficient layer.

A layer of sand 3 is sprinkled or shaken uniformly onto the surface compound. This sand performs importantly in three ways: it imparts hardness to the surface, which otherwise would have the relative softness of the resin; being particulate rather than uniform, it imparts unevenness to the layers of surface compound and thereby breaks up a shear plane that would otherwise exist between the surface compound and the backup slurry; and by its bulk it acts as a barrier which prevents the backup slurry from being forced by the weight of the masonry block to the surface of the mold.

The particle size of this sand layer determines the surface appearance of the masonry building unit, a fine sand producing a smooth surface and a coarser sand producing a grainy surface. Sand having a sieve size of 20 to 60 mesh has been found to produce a surface with an excellent appearance.

Sufficient sand should be applied to completely cover the layer of surface compound 2. An excessive amount of sand will result in some grains not being wetted by the second layer 4 of surface compound when it is applied and will thereby cause formation of voids in the product. This problem is accentuated at the edges of the mold when the second layer 4 of the surface compound is applied by spraying, because the spraying dislodges sand grains which are not adhering to the surface coat 2, and those grains tend to be trapped and to build up at the edges of the mold. Application of 0.35 to 0.47 gram of sand per square inch (45 to 60 grams per block) has been found most satisfactory for this layer.

A second layer 4 of surface compound is then applied to the mold, preferably as an overspray. The amount of surface compound in layer 4 must be sufficient to completely wet the sand layer 3. This amount is in the range of 0.13 to 0.19 gram per square inch (16 to 24 grams per block). Excellent results have been obtained when the combined weight of layers 2 and 4 provides a total of 45 to 55 grams of surface compound per block.

A layer 5 of backup slurry is next added to the mold. The amount of slurry which will yield a satisfactory product is in the range of 1 to 2 pounds for an 8-inch x 16-inch masonry block. The masonry block 7 or other building unit to be coated is then lowered into the mold with the face to be coated downward. Thus, the weight of the block itself places this face against the coating material, and the resin is cured while the block is in this position.

Curing is accomplished by bringing the temperature of the facing to 280 to 300° F. or higher. When direct gas-fired radiation is used, a heating cycle of 14 minutes has been found satisfactory. By changing the type of heating, the required heating cycle can be varied from 12 to 25 minutes or longer. Heating with live steam is not recommended because ingredients in the layers of surface compound tend to separate.

Figure 2B:
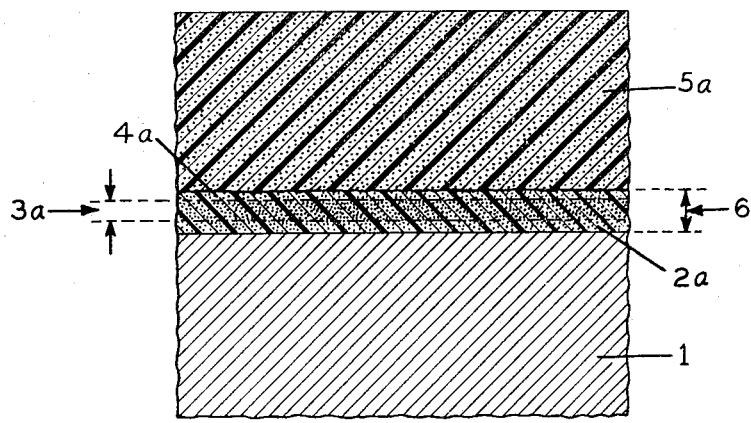
FIG. 2B is a cross-sectional view showing the facing materials in the finished product, corresponding to an enlargement of a portion of FIG. 1.

Although elements 2, 3 and 4 of the building unit are applied to the mold as separate layers as shown in FIG. 2A, the layers 2 and 4 of surface compound completely wet the sand particles of layer 3 and contact one another. Hence the finished product does not contain separate layers 2, 3 and 4, but rather a single layer comprising a mixture of sand and surface compound. This layer is labeled 6 in FIGS. 1 and 2B. The dotted lines in FIG. 2B demarcate in the finished product imaginary layers 2a, 3a and 4a corresponding to the layers 2, 3 and 4. Intermingling of the layers 2, 3 and 4 yields a layer 6 which is similar in composition to the slurry 5 and provides the desired glossy surface finish.

The amount of penetration of the coating composition into the pores of the building block is dependent on the pressure from the weight of the block, the porosity of the block and the consistency of the slurry composition. The amount of penetration can be controlled to some extent by adjustment of the time of introducing the block into the mold. If the block is introduced after the slurry has begun to gel, penetration will be reduced.

In order to disclose more clearly the nature of the present invention, the following examples illustrating the invention are given. It should be understood however that this is done solely by way of example and is intended neither to delineate the scope of the invention nor to limit the ambit of the appended claims. The quantities of material are expressed in terms of parts by weight.

EXAMPLE I

A surface compound with the following ingredients was prepared:

| Ingredient: | Parts |
|---|---|
| Rigid-type polyester resin | 388 |
| Hydroquinone contained in the polyester resin (polymerization retardant) | 0.02 |

| Monomeric solvents: | |
|---|---|
| Styrene | 155 |
| Methyl methacrylate | 93 |
| Ethyl hexyl acrylate | 62 |
| Total | 310 |

| | |
|---|---|
| Cab-O-Sil (thickening agent) | 27 |

| Fire retardants: | |
|---|---|
| Antimony oxide | 21 |
| 70% chlorinated paraffin | 40 |
| Total | 61 |

| | |
|---|---|
| Dow Corning Antifoam A | 1 |
| Triton X114 (wetting agent) | 3 |
| Inert filler, Asbestine | 175 |

Into a metal mold for facing an 8-inch x 16-inch masonry block 30 grams of the surface compound was sprayed with a commercial air atomizing sprayer. Onto this layer of surface compound was shaken a uniform layer of 55 grams of sand having a sieve size of 20 to 60 mesh. This sand had been treated with an alkylene substituted silane bonding agent according to the process of U.S. Pat. No. 3,328,231. A second layer of 20 grams of surface compound was then sprayed uniformly over the sand layer, care being taken to wet the entire layer.

For the sake of convenience the surface compound itself was used as a starting material in the preparation of the backup slurry. The ratio of polyester resin to monomeric solvent, 60:40 in the surface compound, was adjusted to the desired 40:60 by incorporating additional monomeric solvent into the slurry mixture. The backup slurry had the following composition:

| Ingredient: | Parts |
|---|---|
| Surface compound | 100 |
| Styrene | 30 |
| Polymerization catalysts: | |
| t-Butyl perbenzoate | .5 |
| U.S.P. 245 (U.S. Peroxogen Co.) | 0.75 |
| Total | 1.25 |
| Bentone 34 (suspending agent) | 16 |
| Inert fillers: | |
| 60–120 mesh banding sand | 40 |
| 20–60 mesh sand | 360 |
| Magnesium silicate: Asbestine | 88 |
| Total | 488 |
| Brucite, treated with an alkylene substituted silane bonding agent (smoke retardant) | 42 |
| Polyethylene powder, Microthene FN 500 (U.S. Industrial Chemicals) | 8 |
| Dow Corning Antifoam A | 4 |

A uniform layer of 1.2 pounds of this backup slurry was poured into the mold atop the overspray of surface compound. An 8-inch x 16-inch masonry block was then placed onto the backup slurry. The assembled masonry building unit was then cured by direct gas-fired heat at 300° F. for 15 minutes.

EXAMPLE II

A coated masonry building unit was prepared according to the procedure of the previous example with the exception that the amount of thickening agent (Cab-O-Sil) in the surface compound was reduced from 27 parts to 10 parts. From the splotchy appearance of the finished unit, it was apparent that the backup slurry had broken through to the surface of the mold.

EXAMPLE III

A surface compound was prepared by stirring in a mixing vessel just prior to the coating operation a mixture having the following composition:

| Ingredient: | Parts |
|---|---|
| Rigid type polyester (Paraplex P43, believed to be a condensation product of propylene glycol and dipropylene glycol in a ratio of 1 to 3 with phthalic anhydride and maleic anhydride in a ratio of 3 to 2) | 344 |
| Flexible type polyester (Paraplex P13, believed to be a condensation product of ethylene glycol and diethylene glycol with phthalic anhydride, maleic anhydride and adipic acid) | 144 |
| Styrene | 306 |
| Cab-O-Sil | 27 |
| Triton X114 | 4 |
| Asbestine | 200 |
| Titanium dioxide pigment | 5 |

After mixing, 24 grams of this surface compound was sprayed into a mold for facing an 8-inch x 16-inch masonry block. Onto this layer was sprinkled 50 grams of sand having a sieve size of 10 to 30 mesh. A second layer of 24 grams of surface compound was then sprayed uniformly over the sand layer.

A backup slurry composition was prepared by stirring in a mixing vessel just prior to the coating operation an initial mixture having the following composition:

| Ingredient: | Parts |
|---|---|
| Rigid type polyester resin (Paraplex P43) | 5.2 |
| Flexible type polyester resin (Paraplex P13) | 1.7 |
| Styrene | 5.9 |
| Titanium dioxide | 1.3 |
| Inert filler (Asbestine, 325 mesh) | 11.5 |

To this mixture were added the following:

| Ingredient: | Parts |
|---|---|
| Styrene | 6.5 |
| Bentone 34 | 3.5 |
| Methyl ethyl ketone peroxide (catalyst) | 0.5 |
| Manganese naphthenate (catalyst) | 0.4 |

The resulting mix was agitated, and to it was added promptly 86 parts of large grain crystal silica sand and 22 parts of smaller grain banding sand. The sands had the following approximate sieve analyses:

Crystal silica sand

| Sieve sizes: | Percentages |
|---|---|
| 40 | 38 |
| 50 | 41 |
| 70 | 14 |
| 100 | 4 |

Banding sand

| Sieve sizes: | Percentages |
|---|---|
| 50 | 1 |
| 70 | 20 |
| 100 | 48 |
| 140 | 21 |
| 200 | 7 |
| 270 | 3 |

After mixing under a vacuum of 28 inches of mercury for about 15 minutes, one pound of this backup slurry was subjected to an air pressure of 3–5 lbs. per square inch and forced into the mold atop the surface compound. After curing the assembled unit by direct gas-fired heat at 280° F. for 30 minutes, a coated block was obtained which had an excellent adhesion of the coating to the block and which was resistant to marring, scratching, thermal shock, crazing, etc. The coated face was found to be somewhat grainy in appearance relative to the surface of the unit in Example I.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The method of providing a masonry block with an integrally cured glossy and easily cleaned facing which comprises placing in a mold a thin layer of a surface compound comprising an ethenically unsaturated polyester resin and a monomeric polymerizable solvent for said resin, to which has been added a thickening agent in an amount sufficient to cause the surface compound to remain in place as applied and prevent inner layers from being forced to the surface but not so great as to render the surface compound too thick to handle with commercial spraying equipment; spreading thin, uniform layer of sand over the surface layer; completely wetting the sand particles with a thin layer comprising an ethylenically unsaturated polyester resin and a monomeric polymerizable solvent; completing the facing by placing over this second surface layer a slurry comprising an ethylenically unsaturated polyester resin and a polymerizable monomeric solvent and sand as a filler, the latter being in an amount of at least fifty percent and not over ninety percent by weight of the total slurry, the slurry and the surface compounds being heat convertible, and curing without formation of volatile by-products; introducing the block to be coated into the mold with the surface to be faced placed downward while the slurry is in a semi-liquid condition and capable of permeating into the surface of said block; and curing the surface compositions, the slurry, and the block to form a facing which is free of pits and pinholes.

2. The method according to claim 1 wherein the thickening agent comprises more than 1% but less than 4% by weight of the surface compound and the first layer of surface coating in the mold is applied at more than 0.1 but less than 0.35 gram per square inch of mold.

3. The method according to claim 2 wherein the first layer of surface coating in the mold is applied at about 0.30 gram per square inch of mold.

4. The method according to claim 2 wherein the total of the first layer of a surface coating and the layer of a surface coating atop the sand layer is more than .35 but less than .46 gram per square inch of mold.

5. The method according to claim 2 wherein the thickening agent comprises about 2.7% by weight of the surface compound.

6. The method according to claim 2 wherein the application of the layers of surface compound is by spraying.

7. The method according to claim 1 wherein the layer of sand is applied in an amount of about 0.35 to 0.47 gram per square inch of mold surface.

8. The method according to claim 1 wherein the layer of sand is applied in an amount of about 0.43 gram per square inch of mold surface.

9. The method according to claim 7 wherein the sand used in the sand layer and in the slurry has been treated with 0.1% to 2% by weight of an alkylene substituted silane compound to impart added stain resistance to the facing.

References Cited

UNITED STATES PATENTS

| | | | |
|---|---|---|---|
| 2,751,775 | 6/1956 | Sergoric | 264—271 X |
| 3,030,234 | 4/1962 | McClinton | 52—309 X |
| 3,194,724 | 7/1965 | Sergoric | 52—309 X |
| 3,328,231 | 6/1967 | Sergoric | 260—40 X |

ROBERT F. WHITE, Primary Examiner

T. PAVELKO, Assistant Examiner

U.S. Cl. X.R.

52—309